United States Patent
Yasuda et al.

(10) Patent No.: US 7,529,008 B2
(45) Date of Patent: May 5, 2009

(54) HOLOGRAM RECORDING METHOD AND HOLOGRAM RECORDING DEVICE

(75) Inventors: Shin Yasuda, Kanagawa (JP); Katsunori Kawano, Kanagawa (JP); Jiro Minabe, Kanagawa (JP); Koichi Haga, Kanagawa (JP); Yasuhiro Ogasawara, Kanagawa (JP); Kazuhiro Hayashi, Kanagawa (JP); Hisae Yoshizawa, Kanagawa (JP); Makoto Furuki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 206 days.

(21) Appl. No.: 11/604,736

(22) Filed: Nov. 28, 2006

(65) Prior Publication Data
US 2007/0291342 A1    Dec. 20, 2007

(30) Foreign Application Priority Data
Jun. 20, 2006  (JP)  ............................. 2006-170602

(51) Int. Cl.
*G03H 1/10* (2006.01)
*G03H 1/12* (2006.01)

(52) U.S. Cl. .............................. 359/11; 359/10; 359/35

(58) Field of Classification Search .................. 359/10, 359/11, 22, 35
See application file for complete search history.

(56) References Cited

U.S. PATENT DOCUMENTS

| 4,701,006 A * | 10/1987 | Perlmutter | 359/9 |
| 6,320,683 B1 * | 11/2001 | Ito et al. | 359/22 |
| 6,798,547 B2 * | 9/2004 | Wilson et al. | 359/10 |

FOREIGN PATENT DOCUMENTS

JP    A 2004-272268    9/2004

* cited by examiner

*Primary Examiner*—Audrey Y Chang
(74) *Attorney, Agent, or Firm*—Oliff & Berridge, PLC

(57) ABSTRACT

A hologram recording method for recording information of signal light as holograms in an optical recording medium, which includes illuminating signal light at the optical recording medium; illuminating reference light at the optical recording medium simultaneously with the signal light such that an interference pattern is formed by the signal light and the reference light intersecting in the optical recording medium; and shifting a region in the optical recording medium at which the signal light and the reference light intersect, by shifting an illumination position of the reference light along an optical axis of the signal light, thereby recording a plurality of holograms in the recording medium.

12 Claims, 18 Drawing Sheets

HOLOGRAM RECORDING METHOD AND HOLOGRAM RECORDING DEVICE

BACKGROUND

1. Technical Field

The present invention relates to a hologram recording method and a hologram recording device, and particularly relates to a hologram recording method and hologram recording device for recording a plurality of holograms at an optical recording medium.

2. Related Art

Heretofore, in order to realize increases in density in volumetric recording of holograms, methods of multiplexing a plurality of holograms in the same locality of a recording medium have been proposed, such as an angle multiplexing recording method which records with an incidence angle of reference light being altered, a shift multiplexing recording method which records with the recording medium being moved in small amounts, a wavelength multiplexing recording method which records with wavelengths of signal light and reference light being altered, and so forth.

SUMMARY

A first aspect of the present invention is a hologram recording method for recording information of signal light as a hologram at an optical recording medium, the method including: illuminating signal light at the optical recording medium; illuminating reference light at the optical recording medium simultaneously with the signal light such that an interference pattern is formed by the signal light and the reference light intersecting in the optical recording medium; and shifting a region in the optical recording medium at which the signal light and the reference light intersect, by shifting an illumination position of the reference light along an optical axis of the signal light, thereby recording a plurality of holograms in the recording medium.

BRIEF DESCRIPTION OF THE DRAWINGS

Exemplary embodiments of the present invention will be described in detail based on the following figures, wherein.

DETAILED DESCRIPTION

Herebelow, a hologram recording/reproduction device of an exemplary embodiment of the present invention will be described in detail with reference to the drawings. The hologram recording/reproduction device of the present exemplary embodiment employs a multiplexing recording method of the present invention.

First Exemplary Embodiment

Figure 1:
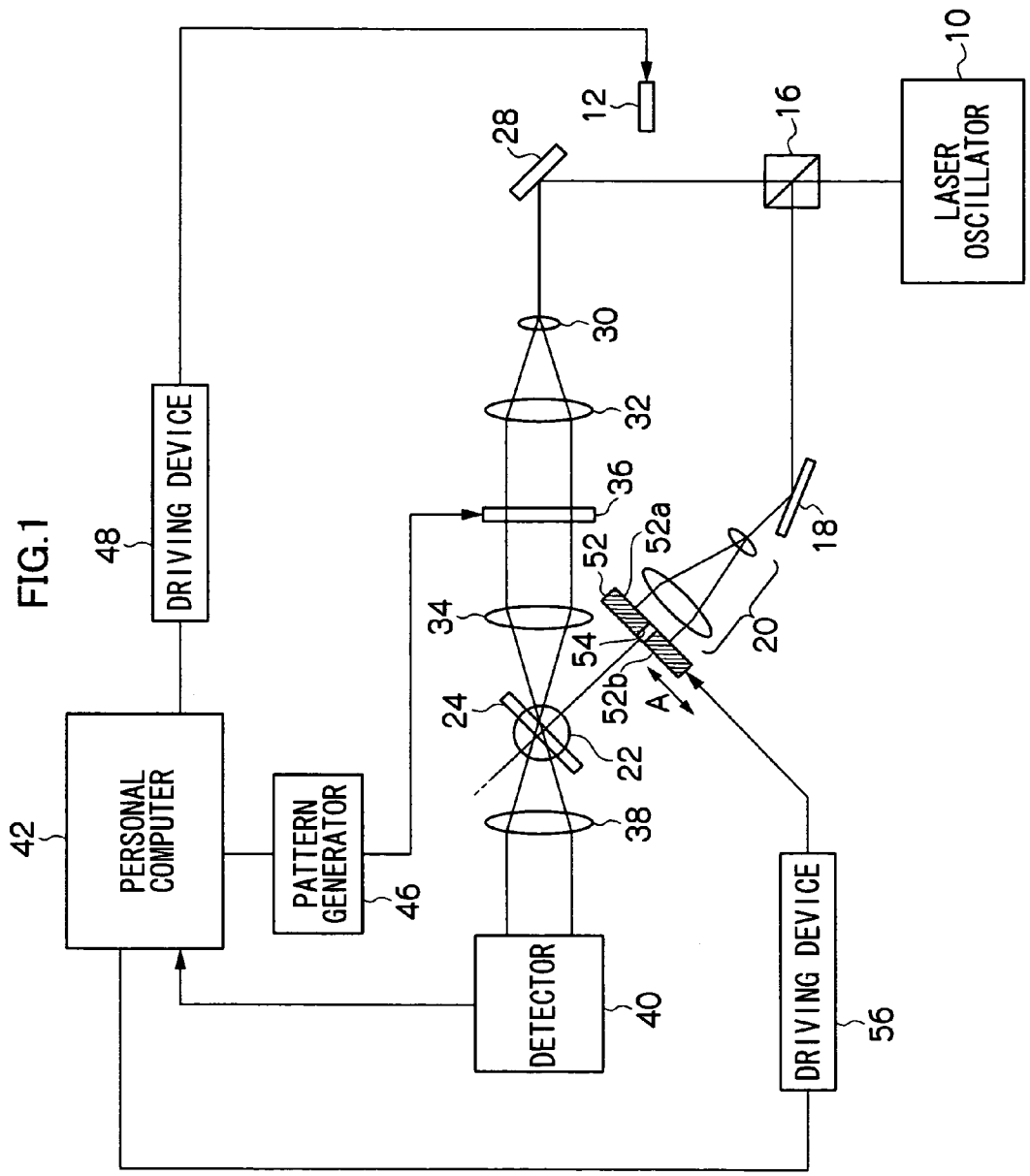
FIG. 1 is a schematic view of a hologram recording/reproduction device of a first exemplary embodiment of the present invention.

As shown in FIG. 1, the hologram recording/reproduction device of the present exemplary embodiment is provided with a laser oscillator 10 employing, for example, an Nd:YVO$_4$ crystal. Laser light with wavelength 532 nm, which is coherent light, is emitted from the laser oscillator 10. At a laser light irradiation side of the laser oscillator 10, a half-mirror 16 is disposed which, by transmitting a portion of incident light and reflecting a portion of the same, divides the laser light into two light beams, a beam for reference light and a beam for signal light.

At the light reflection side of the half-mirror 16, a reflection mirror 18, a pair of lenses 20 and a masking plate 52 are arranged in this order. The reflection mirror 18 reflects the reference light laser beam and changes a light path thereof to a hologram recording medium direction. The lenses 20 collimate the reference light laser beam. A slit 54 is formed in the masking plate 52. As will be described later, the masking plate 52 is structured to be movable in a direction intersecting an optical axis of the reference light (the direction of arrow A). At the laser light transmission side of the masking plate 52, a stage 22 is disposed, which retains a hologram recording medium 24 at a predetermined position. The reference light that has been transmitted through the slit 54 of the masking plate 52 is illuminated onto the hologram recording medium 24.

At the light transmission side of the half-mirror 16, a shutter 12, for blocking the laser light transmitted through the half-mirror 16, is disposed to be capable of moving into a light path and out of the light path. At the light transmission side of the shutter 12, a reflection mirror 28 and a lens system are disposed in this order. The reflection mirror 28 reflects the signal light laser beam with a reflection angle of 45° and changes the light path thereof to a hologram recording medium direction. The lens system is structured by a lens 30, a lens 32 and a lens 34. Between the lens 32 and the lens 34, a transmission-type spatial light modulator 36 is disposed. The spatial light modulator 36 is structured by a liquid crystal display device or the like, modulates the signal light laser beam in accordance with recording signals which are provided for each of pages, and generates signal light for recording holograms of the respective pages.

The lens 30 and lens 32 expand the laser light into a large-diameter collimated beam, which illuminates the spatial light modulator 36. The lens 34 focuses the laser light that has been modulated and transmitted by the spatial light modulator 36 onto the hologram recording medium 24 to serve as signal light. Thus, the signal light and the reference light are simultaneously illuminated onto the hologram recording medium 24 and a hologram is recorded. When reference light is subsequently illuminated onto the hologram that has been recorded, signal light is reproduced by diffraction from the hologram.

At a reproduction light transmission side of the hologram recording medium 24, a lens 38 and a detector 40 are disposed. The detector 40 is structured by an image capture device such as a CCD or the like, converts received reproduction light to electrical signals and outputs the same. The detector 40 is connected to a personal computer 42. Although not illustrated, the personal computer 42 is equipped with a CPU, ROM, RAM, external memory, an input device, an output device and so forth.

The personal computer 42 is connected to the spatial light modulator 36 via a pattern generator 46, which generates patterns in accordance with recording signals which are provided from the personal computer with predetermined timings. A driving device 48 is also connected to the personal computer 42. The driving device 48 drives the shutter 12 so as to enter the light path and also drives the shutter 12 that has entered the light path so as to move away from the light path. The personal computer 42 is further connected to a driving device 56, which drives the masking plate 52.

Figure 2:
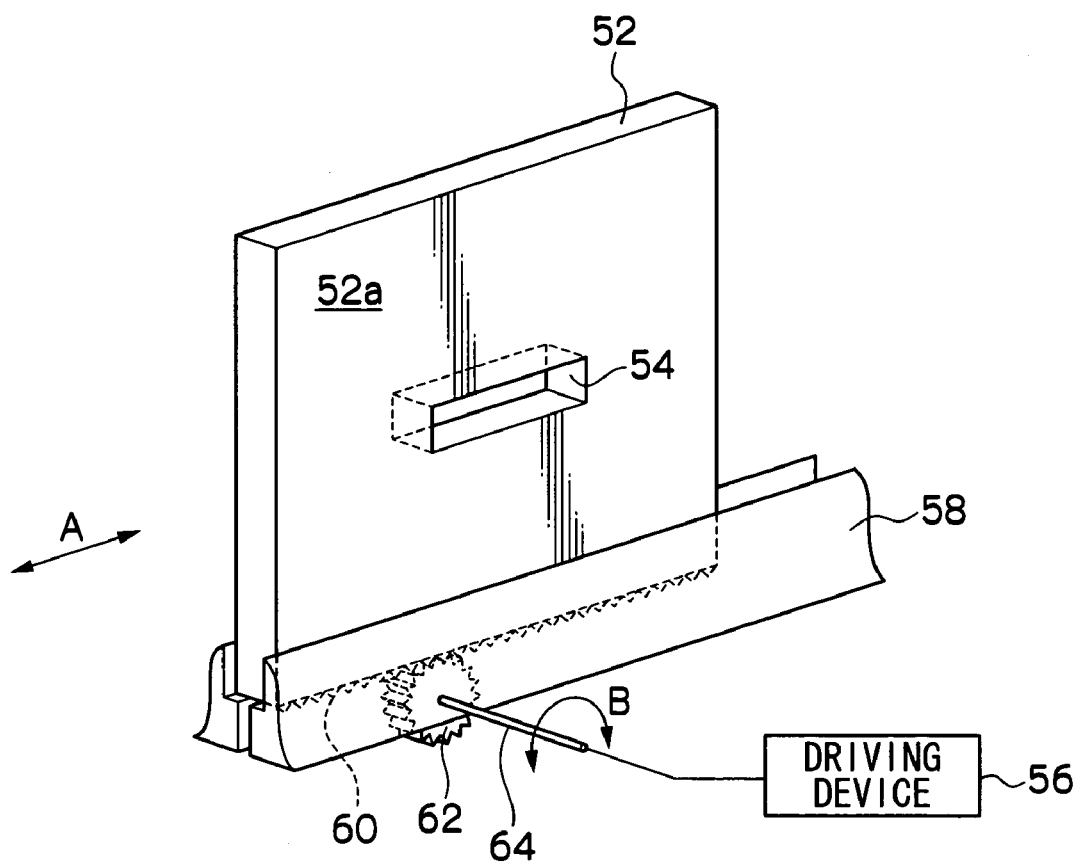
FIG. 2 is a perspective view showing structure of a masking plate in which a slit is formed.

Structure of the masking plate 52 is shown in FIG. 2. The masking plate 52 is provided with the slit 54, whose length direction is along the direction of arrow A. The masking plate 52 is retained to be movable in the directions of arrow A by a retention member 58 which serves as a guide. A movement mechanism such as, for example, a rack and pinion structure as shown in FIG. 2 can be provided. Specifically, this movement mechanism is provided with a gearwheel (pinion) 62, which is joined to a shaft 64 and rotates integrally with the shaft 64, teeth (a rack) 60, which are provided below the masking plate 52 and are capable of meshing with the pinion 62, and the driving device 56, which is a motor or the like. With such a structure, the pinion 62 is turned in the directions of arrow B about the shaft 64 by the driving device 56, the rack 60 meshes with the pinion 62 in accordance with the rotation of the pinion 62, and the masking plate 52 is moved in the directions of arrow A.

Next, operation of the hologram recording/reproduction device described above will be described.

Firstly, at a time of recording of a hologram, the driving device 48 drives to move the shutter 12 out of the light path, and digital data from the personal computer 42 is outputted to the pattern generator 46 with predetermined timing.

Laser light emitted from the laser oscillator 10 is divided into the beam for reference light and the beam for signal light by the half-mirror 16. The beam for signal light which has been transmitted through the half-mirror 16 is reflected by the reflection mirror 28, is collimated into a large-diameter beam by the lens 30 and the lens 32, and is illuminated at the spatial light modulator 36. When digital data is inputted from the personal computer 42, the pattern generator 46 generates display patterns in accordance with the digital data that is provided. The laser light is modulated at the spatial light modulator 36 in accordance with the displayed patterns, and signal light is generated.

Meanwhile, the beam for reference light which has been reflected by the half-mirror 16 is reflected by the reflection mirror 18, is collimated by the pair of lenses 20 and is illuminated at the masking plate 52. At the masking plate 52, only a portion of the light is transmitted through the slit 54, which is an aperture, and reference light is generated. The rest of the laser light is blocked by the masking plate 52.

Figure 5:
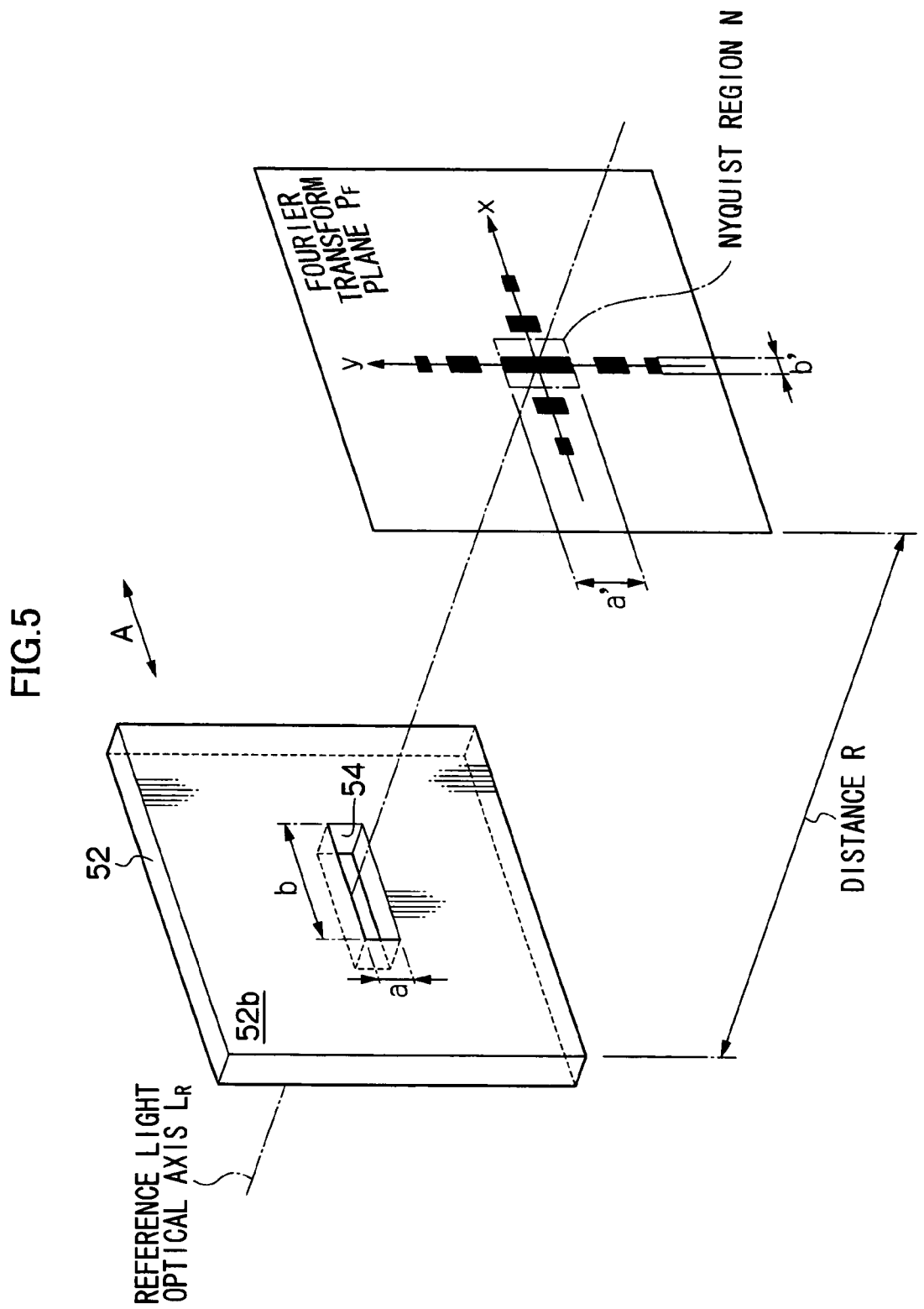
FIG. 5 is a schematic diagram showing a relationship between slit shape and a Fraunhofer diffraction image.

As shown in FIG. 5, if a distance R between the masking plate 52 and the hologram recording medium 24 (more precisely, a Fourier transform plane $P_F$) satisfies the condition $R > (a^2 + b^2)/(2\lambda)$ ($\lambda$ being wavelength), then Fraunhofer diffraction occurs, similarly to a case of Fourier transformation by a lens, and it is possible to obtain a Fourier transform image. Horizontally long light which has been transmitted through the slit 54 whose length direction is the direction of arrow A is light of which, at the Fourier transform plane $P_F$, a length (b') in a direction along the optical axis of the signal light (i.e., a direction onto which the optical axis of the signal light can be projected, which is an x-direction) is shorter than a length (a') in a direction crossing the optical axis (a y-direction). That is, at the Fourier transform plane $P_F$, the reference light is vertically long light. A Fraunhofer diffraction image (the Fourier transform image) is schematically drawn in FIG. 5. The portions drawn in black correspond to bright points of the actual Fourier transform image. Furthermore, as the distance R increases, although the size of the Fourier transform image increases, the shape thereof does not change. Ordinarily, because of the effects of diffraction, a' is larger than a and b' is larger than b.

Figure 6:
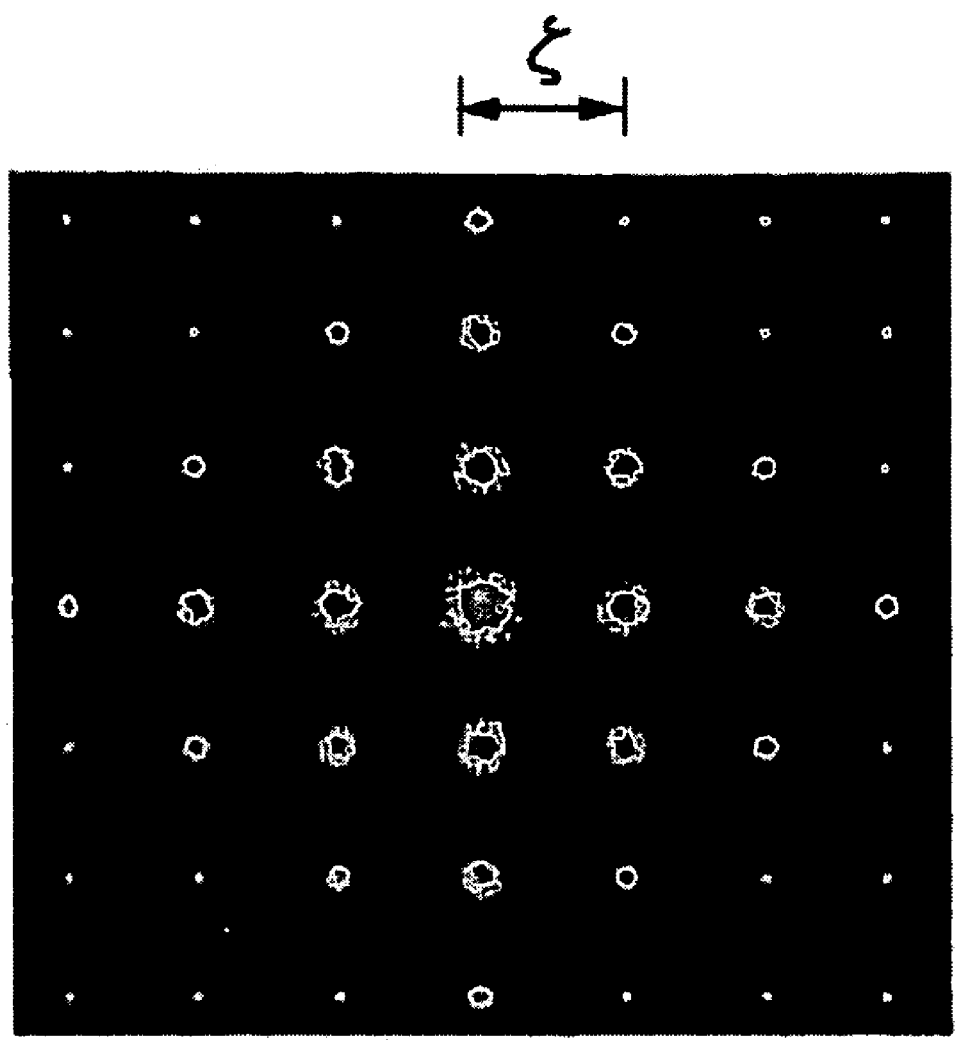
FIG. 6 is a view showing an example of a Fourier transform image of a digital image (signal light)

For reference, an example of a Fourier transform image of a digital image (signal light) is shown in FIG. 6. As shown in FIG. 6, the Fourier transform image of the digital image is a diffraction pattern based on periodic characteristics of the digital image, and includes zero-th order to n-th order components. The orders referred to here are a sequence of bright points which appear in the Fourier transform image at distance intervals of $\zeta = f_s \lambda / d$ from the zero-th order (i.e., the middle), which are determined by the focusing distance $f_s$ of a Fourier transform lens, a recording wavelength $\lambda$ and a pixel pitch d/2 of a spatial light modulator at which the digital image is generated. With the Fourier transform image, provided diffraction components are recorded with a recording area including at least a Nyquist region $(2f_s \lambda / d)^2$, information of the digital image can be recorded without losses.

The signal light that is generated is Fourier-transformed by the lens 34 and illuminated at the hologram recording medium 24. The reference light is Fraunhofer-diffracted, similarly to a case of being Fourier-transformed, and illuminated at the hologram recording medium 24 simultaneously with the signal light. Consequently, the signal light and the reference light interfere inside the hologram recording medium 24, and an interference pattern is recorded as a hologram.

As the hologram recording medium 24, it is possible to employ an optical recording medium for hologram recording, which utilizes a recording material such as, for example, a photopolymer, an azopolymer, a photonic crystal or the like.

When a hologram that has been recorded is to be reproduced, the driving device 48 drives to move the shutter 12 into the light path. Laser light emitted from the laser oscillator 10 is reflected by the half-mirror 16, the light path thereof is altered to the direction of the hologram recording medium 24 by the reflection mirror 18, and the light is collimated by the pair of lenses 20 and illuminated onto the masking plate 52. Reference light that is transmitted through the slit 54 of the masking plate 52 is illuminated at a region of the hologram recording medium 24 at which the hologram has been recorded.

The illuminated reference light is diffracted by the hologram, and the diffracted light passes through the hologram recording medium 24 and is emitted. The emitted diffracted light is reverse Fourier-transformed by the lens 38, and is incident at the detector 40. Thus, a reproduction image that is captured is sensed by the detector 40. The sensed analog data is A/D-converted by the detector 40, and image data of the reproduction image is inputted to the personal computer 42.

Figure 3A:
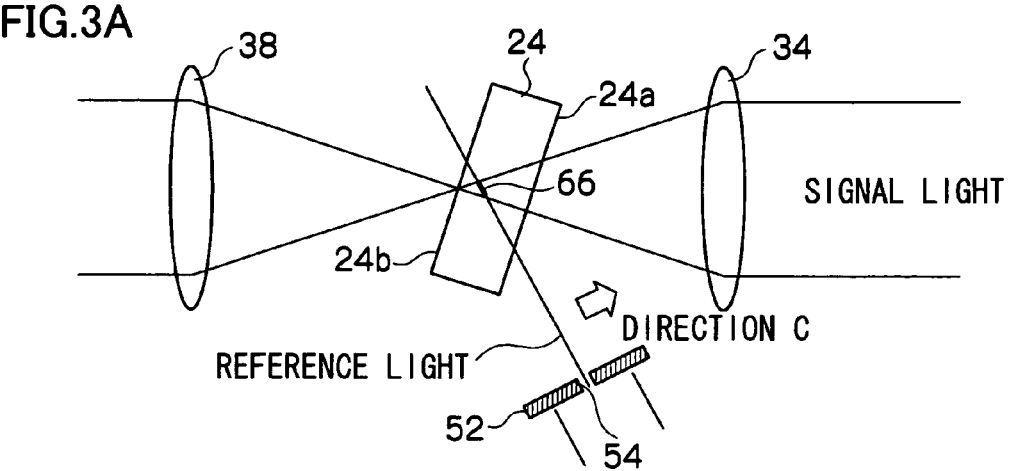
FIGS. 3A and 3B are explanatory views for describing a process of slice multiplexing recording.
Figure 3B:
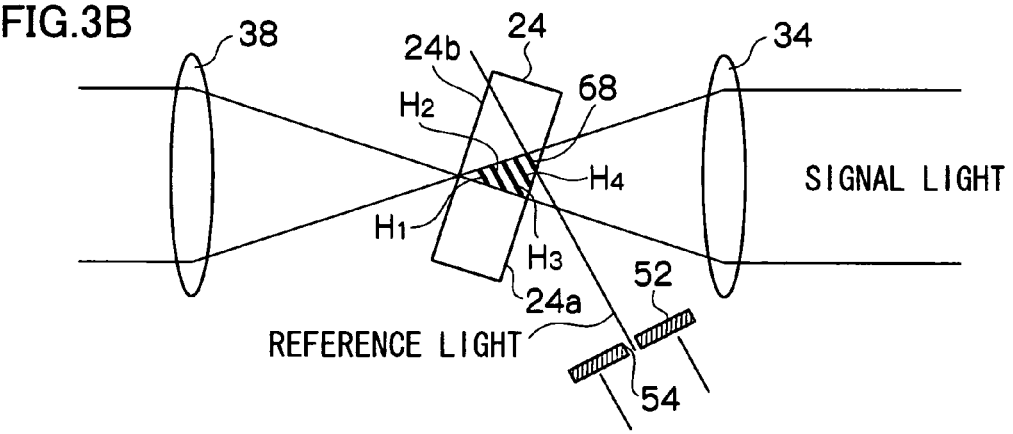

In the present exemplary embodiment, firstly, as shown in FIG. 3A, the vertically long reference light is illuminated, and a first hologram $H_1$ is recorded at a region of intersection 66 with the signal light. Then, as shown in FIG. 3B, the masking plate 52 is moved in the direction of arrow C along the retention member 58, which is a guide, by a predetermined interval Δn (an arbitrary value which is equal to or greater than b'), the vertically long reference light is again illuminated, and a second hologram $H_2$ is recorded at a region of intersection with the signal light. Similarly, a third hologram $H_3$ and a fourth hologram $H_4$ are recorded in sequence. Finally, the masking plate 52 is moved in the direction of arrow C along the retention member 58 which is a guide by the predetermined interval, the vertically long reference light is illuminated, and a fifth hologram $H_5$ is recorded at a region of intersection 68 with the signal light. In this manner, the holograms $H_1$, $H_2$, $H_3$, $H_4$ and $H_5$ are recorded in this order from an emission face 24b of the hologram recording medium 24, which is at the opposite side thereof from a recording light incidence face 24a.

Figure 4:
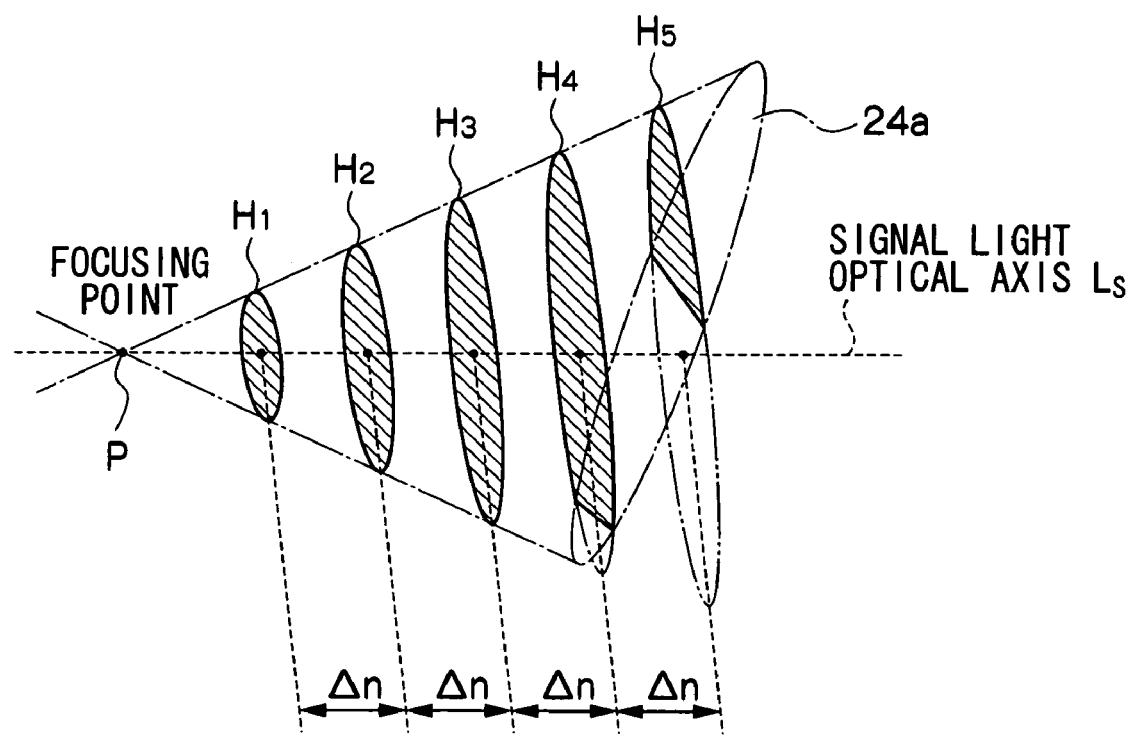
FIG. 4 is a conceptual view showing a recording region which is recorded in by slice multiplexing.

As shown in FIG. 4, if the signal light is focused at a focusing point P at the emission face 24b of the hologram recording medium 24 (see FIGS. 3A and 3B), the signal light and the reference light can be caused to sequentially intersect such that the vertically long reference light slices up an illumination region of the signal light, which has a substantially conical form centered on the optical axis $L_S$. Herebelow, this multiplexing method is referred to as slice multiplexing. Thus, it is possible to record a plurality of holograms in the hologram recording medium 24. In the present exemplary embodiment, an example is described in which five holograms (the holograms $H_1$, $H_2$, $H_3$, $H_4$ and $H_5$) are recorded at the predetermined interval Δn which is at least b'. However, it is possible to increase the number of holograms to be recorded by making the beam width of the reference light in the x-direction smaller.

Figure 7:
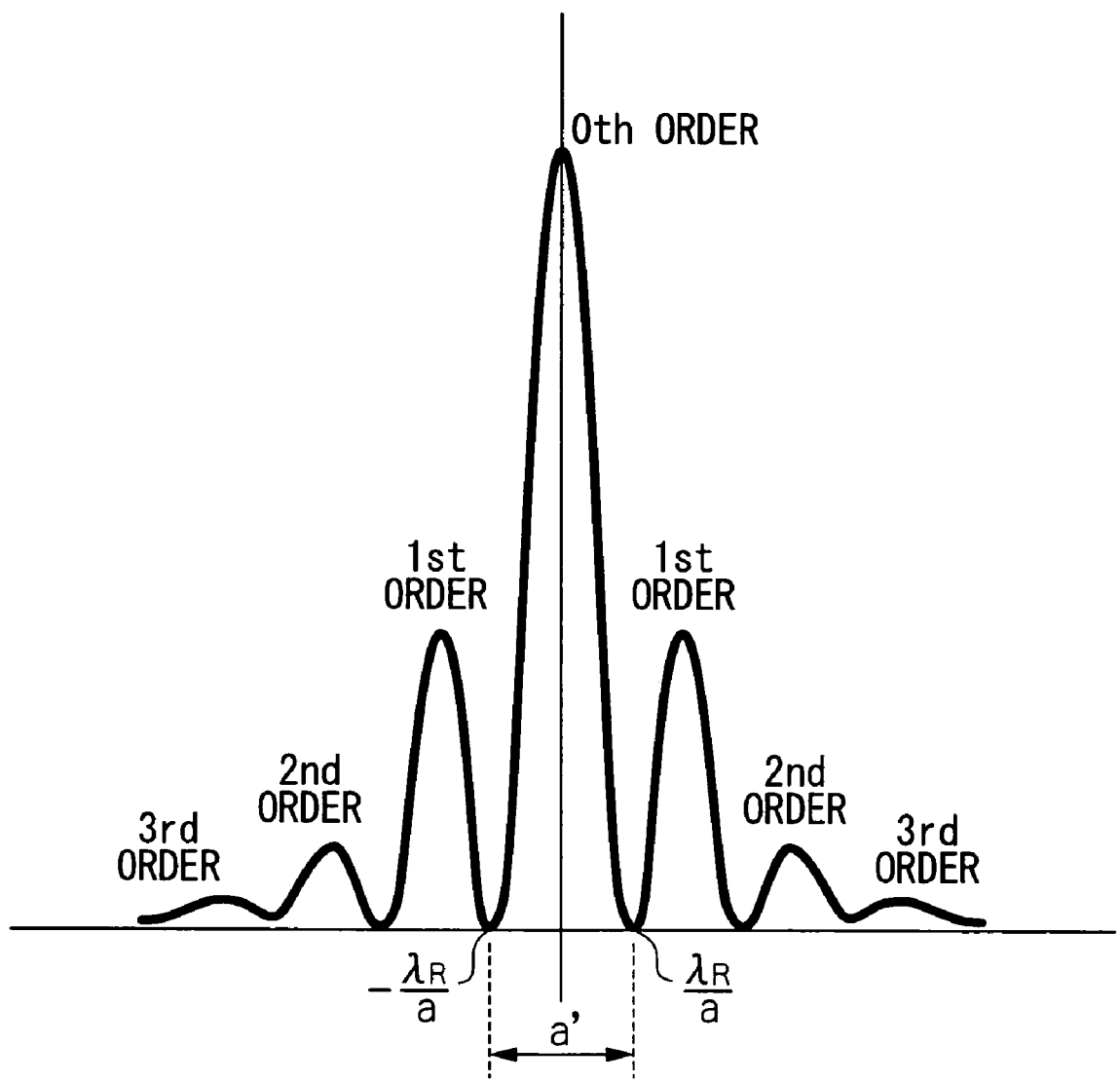
FIG. 7 is a diagram showing a Fourier transform spectrum in an x-direction.

As shown in FIG. 5, the y-direction beam width a' and the x-direction beam width b' of the reference light at the Fourier transform plane $P_F$ are set in accordance with the aforementioned distance R, the recording wavelength λ, and the opening widths a and b of the slit 54. Here, the slit 54 is a rectangular opening, with a being an opening width in the short direction and b being an opening width in the long direction. FIG. 7 is a graph showing a Fourier-transformed spectrum of the reference light in the y-direction. Because it is sufficient if the reference light intersects with diffraction components in the Nyquist region of the signal light, if a condition $2\lambda R/a \geq 2f_s\lambda/d$ applies, then the reference light in $2\lambda R/a$ and the signal light can intersect. That is, it is sufficient if light in a region with $a'=2\lambda R/a$ intersects with the signal light. (In FIG. 5, this region is shown as a Nyquist region N.) Furthermore, a number of multiplexed holograms increases as the x-direction beam width becomes narrower, and it is sufficient if light with $b'=2(\lambda R/b)$ is illuminated at the optical recording medium.

The y-direction beam width a' of the reference light at the Fourier transform plane $P_F$ interferes with all frequency components of the signal light (at least a Nyquist component and above). The x-direction beam width b' of the reference light at the Fourier transform plane $P_F$ is desirably as small as possible, in other to increase the number of multiplexed holograms. For example, if the x-direction beam width b' of the reference light is set to 100 μm, it is possible to record 10 holograms by slice multiplexing in a recording layer with thickness 1 mm. Herein, the spacing of holograms that neighbor one another can be set in accordance with the x-direction beam width b' of the reference light.

As described hereabove, with the first exemplary embodiment, a plurality of holograms can be recorded in a hologram recording medium by slice multiplexing, and the number of multiplexed holograms (i.e., data density) can be increased. Further, by combining slice multiplexing with another multiplexing method (angle multiplexing, shift multiplexing, wavelength multiplexing or polytopic multiplexing), a further increase in the number of multiplexed holograms is possible.

For example, there may be a system which can multiplex holograms of 10 pages in a certain region of a hologram recording medium by an angle multiplexing recording method alone. In such a case, if a signal light illumination region can be sliced into five slices by reference light, then it is possible to quintuple the number of multiplexed holograms (i.e., record 50 pages of holograms). To put it another way, there may be a case in which multiplexed holograms of 500 pages by an angle multiplexing recording method is desired but it is only possible to multiplex holograms of 100 pages, due to mechanical limitations. In such a case, the recording of holograms of 500 pages can be realized with the method of the present invention.

Moreover, with slice multiplexing, because the illumination region of the reference light when an individual hologram is to be recorded is small, unnecessary exposure by the reference light is reduced. Further, with slice multiplexing, an illumination position of the reference light is shifted to perform the multiplex recording, and there is no need to move the hologram recording medium, which is convenient.

For the first exemplary embodiment, an example has been described in which the masking plate in which the slit is formed is translationally moved, but this translational movement of the masking plate is merely an example. Other kinds of structure can also be considered as structures for shifting the illumination position of the reference light.

Figure 8:
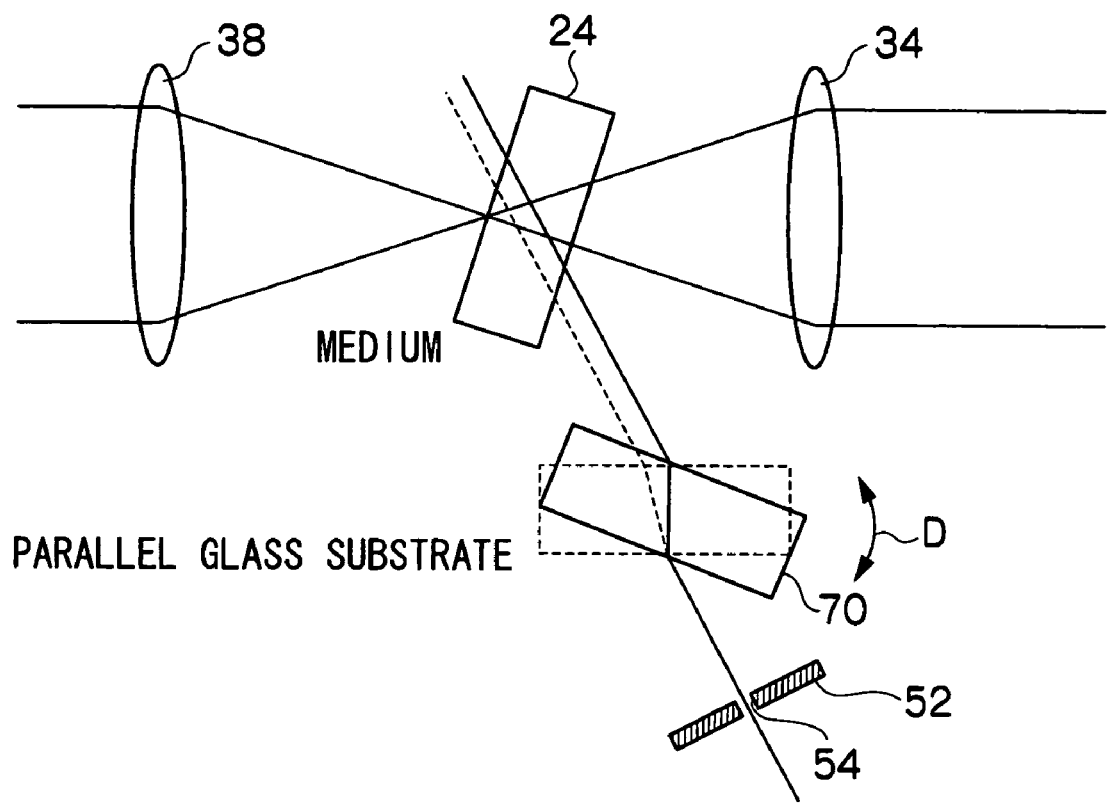
FIG. 8 is a schematic view showing another example of structure with which an illumination position of reference light is shifted.

For example, as shown in FIG. 8, it is possible to fixedly dispose the masking plate 52 at which the slit 54 is provided, and to dispose a transparent plate 70 of which two opposing faces are parallel, such as a parallel glass substrate or the like, between the masking plate 52 and the hologram recording medium 24. This transparent plate 70 is supported to be turnable about a predetermined axis (in the directions of arrow D). The incidence angle of the reference light on the transparent plate 70 is altered by the transparent plate 70 turning. As a result, the optical axis of the reference light that is emitted is translationally moved due to refraction. With a structure which employs the transparent plate 70, because there is no need to move the masking plate 52, a beam diameter of the light that is illuminated at the masking plate 52 can be made smaller. Accordingly, intensity of the light that is illuminated at the masking plate 52 can be made larger.

Figure 9:
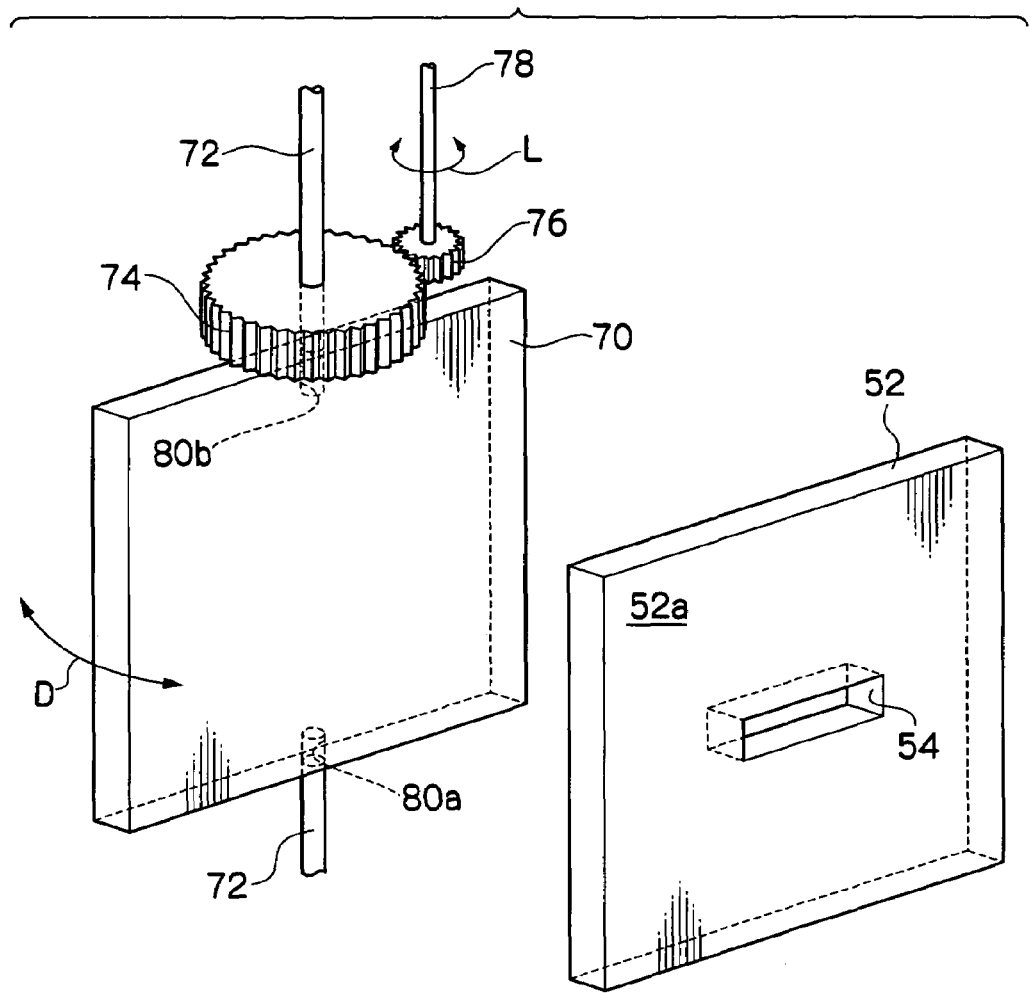
FIG. 9 is a perspective view showing the other example of structure with which the illumination position of the reference light is shifted.

As an example, as shown in FIG. 9, a hole 80a is formed in a lower portion of the transparent plate 70, a hole 80b is formed in an upper portion of the transparent plate 70, and shafts 72 are fitted into the holes 80a and 80b. This movement mechanism is provided with a gearwheel 74, which is joined to one of the shafts 72 and rotates integrally with the shaft 72, a gearwheel 76, which can mesh with the gearwheel 74, and a driving mechanism such as a motor or the like (not shown) which turns the gearwheel 76 about a shaft 78. With this structure, the gearwheel 76 is turned about the shaft 78 in the directions of arrow L by the driving device, the gearwheel 74 meshes with the gearwheel 76 in accordance with the rotation of the gearwheel 76, and the transparent plate 70 is turned about the shafts 72 in the directions of arrow D. Horizontally long light that is transmitted through the slit 54 is Fourier-transformed and becomes vertically long reference light, and when the transparent plate 70 turns, this vertically long reference light is translationally moved in the direction along the optical axis of the signal light.

Figure 10:
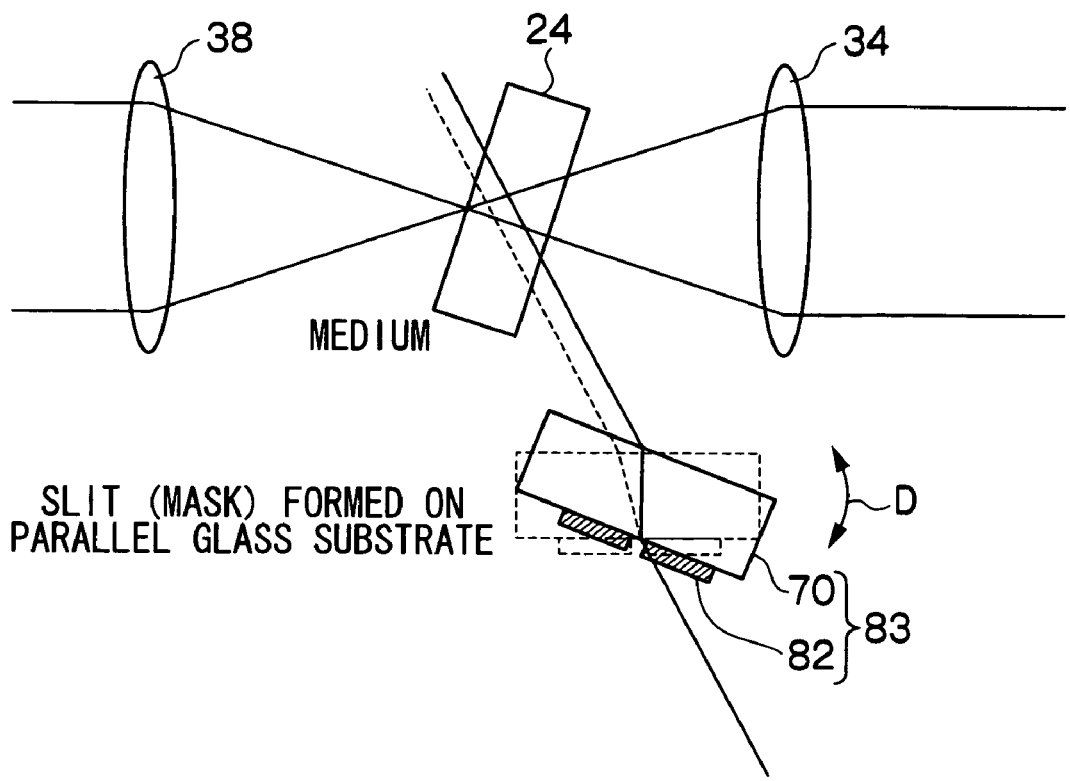
FIG. 10 is a schematic view showing still another example of structure with which the illumination position of the reference light is shifted.

Further, as shown in FIG. 10, it is possible to mount a masking plate 82, in which a slit is formed, to a face of the turnably supported transparent plate 70 at the light incidence side thereof, to structure a masking plate-mounted transparent plate 83. In this case, similarly, the vertically long reference light is translationally moved in the direction along the optical axis of the signal light by the transparent plate 70 turning.

Figure 11:
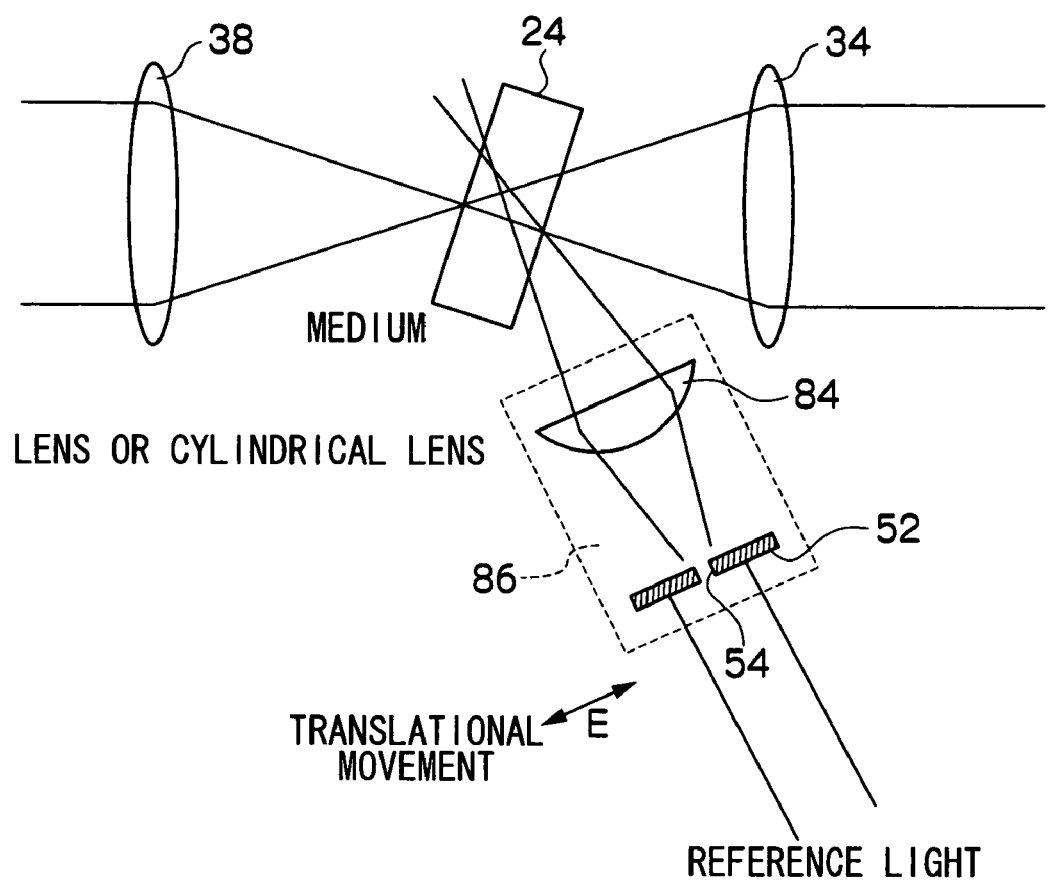
FIG. 11 is a schematic view showing yet another example of structure with which the illumination position of the reference light is shifted.

Further yet, as shown in FIG. 11, it is possible to dispose a lens 84 between the masking plate 52 in which the slit 54 is formed and the hologram recording medium 24, to fixedly dispose the masking plate 52 and the lens 84 on a substrate 86, and to translationally move the optical axis of the signal light in an orthogonal direction (the directions of arrow E) along with the substrate 86. When the lens 84 is interposed, the distance between the masking plate 52 and the hologram recording medium 24 can be made smaller. If the long side of the slit 54 is 100 µm long, then if the lens 84 is not interposed, the distance R between the masking plate 52 and the hologram recording medium 24 will be around 40 mm in order to obtain a Fraunhofer diffraction image. When the lens 84 is interposed, the distance between the masking plate 52 and the hologram recording medium 24 can be set to be equivalent to twice the focusing distance of the lens 84: if the focusing distance thereof is 5 mm, the distance can be set to 10 mm. In order to make the y-direction beam width a' of the reference light at the Fourier transform plane $P_F$ large at a short distance, the lens 84 is preferably structured by a cylindrical lens.

Figure 12:
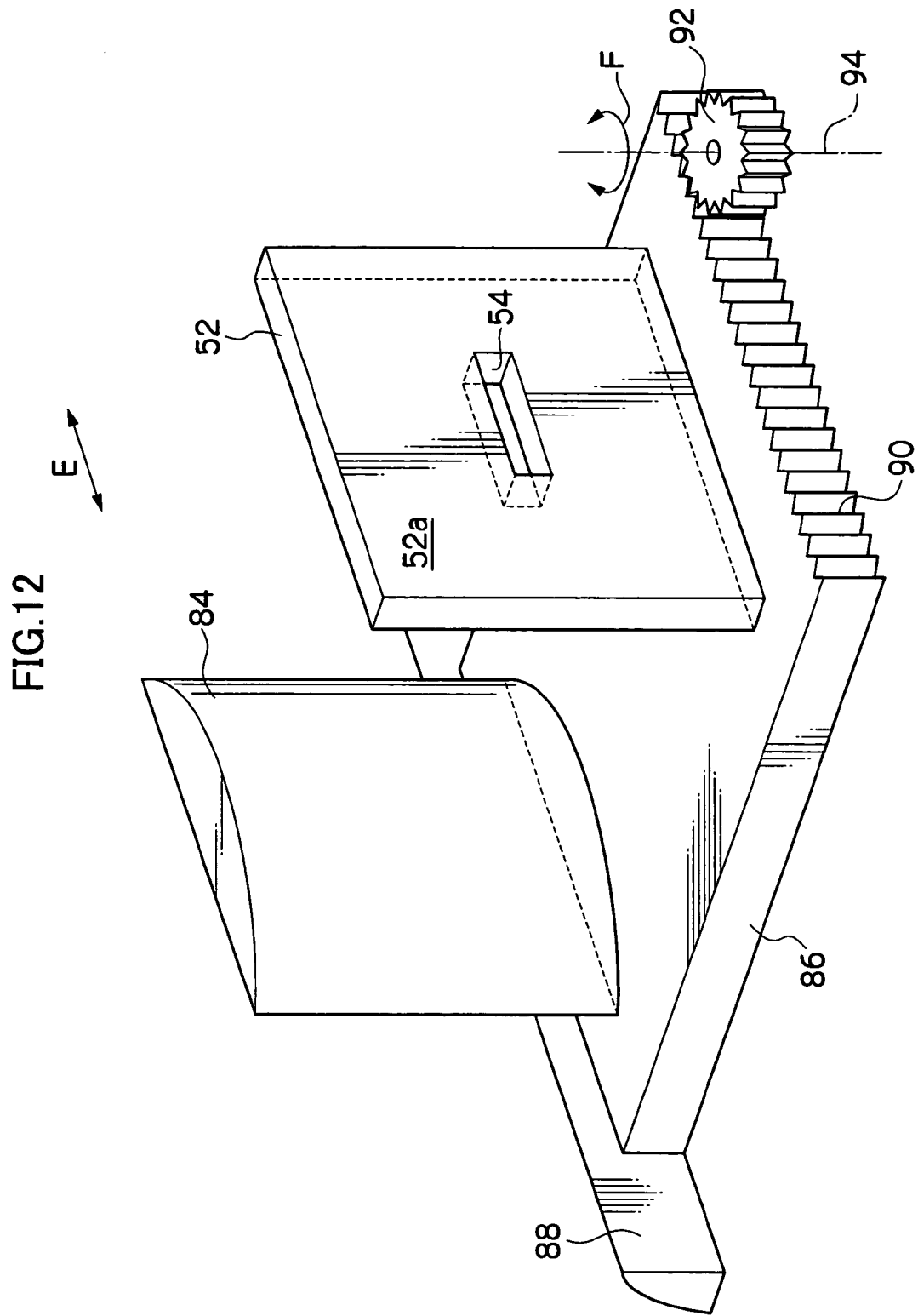
FIG. 12 is a perspective view showing the yet another example of structure with which the illumination position of the reference light is shifted.

For example, as shown in FIG. 12, one end face of the substrate 86 can abut against a guide 88, with a rack and pinion-structure movement mechanism provided. Specifically, this movement mechanism is provided with a gearwheel (pinion) 92, which is joined to a shaft 94 and rotates integrally with the shaft 94, teeth (a rack) 90, which are provided at a face of the substrate 86 at the opposite side thereof from the abutting face and are capable of meshing with the pinion 92, and a driving device such as a motor or the like (not shown). With this structure, the pinion 92 is turned in the directions of arrow F about the shaft 94 by the driving device, the rack 90 meshes with the pinion 92 in accordance with the rotation of the pinion 92, and the substrate 86 is moved in the directions of arrow E.

Figure 17:
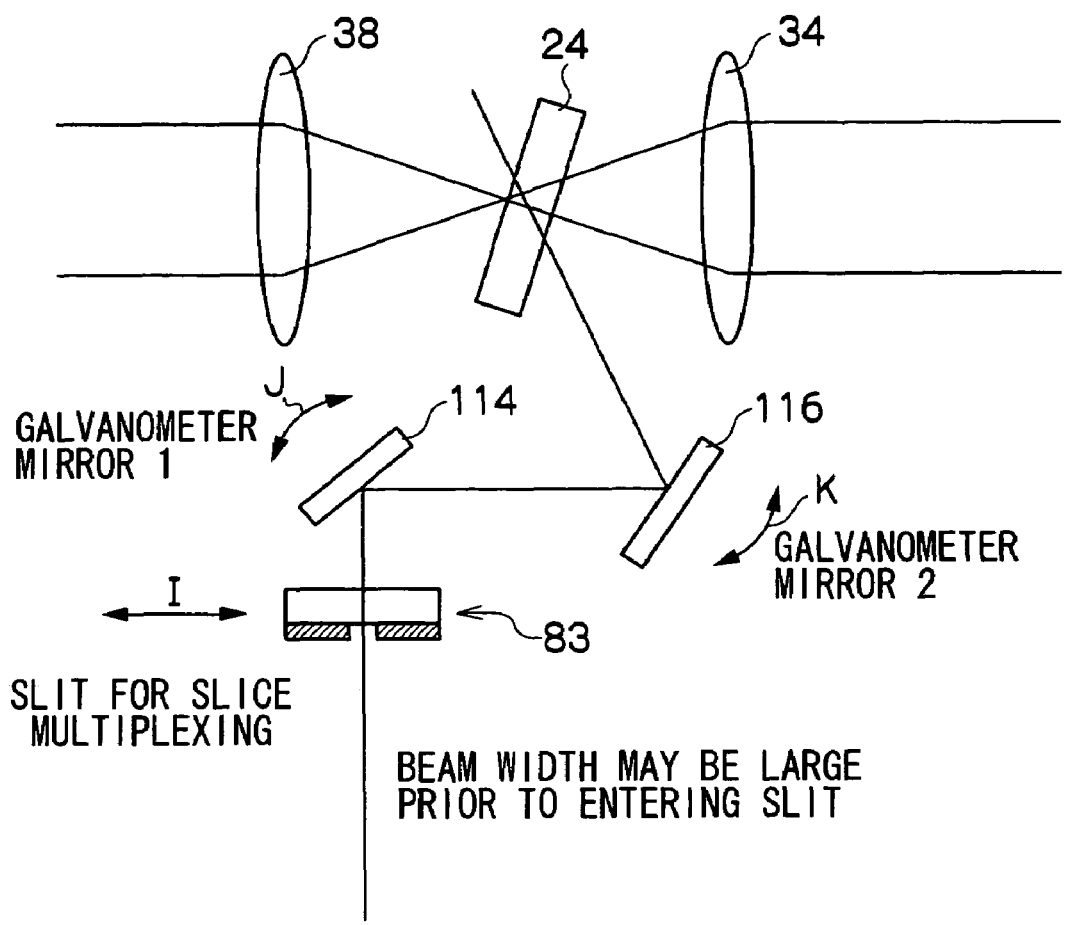
FIG. 17 is a schematic view showing further still another example of structure with which the illumination position of the reference light is shifted.

Further, as shown in FIG. 17, a galvanometer mirror 114 and a galvanometer mirror 116 may be disposed between the masking plate-mounted transparent plate 83 (see FIG. 10) and the hologram recording medium 24. The galvanometer mirror 114 is supported to be turnable in the directions of arrow J, and the galvanometer mirror 116 is supported to be turnable in the directions of arrow K. In this structure, the masking plate-mounted transparent plate 83 can be fixed and angle multiplexing recording implemented by turning the two galvanometer mirrors. Alternatively, the two galvanometer mirrors can be fixed, and the vertically long reference light translationally moved in the direction along the optical axis of the signal light by the masking plate-mounted transparent plate 83 being moved orthogonally (in the direction of arrow I) with respect to the optical axis of the reference light. Thus, slice multiplexing recording can be implemented. By combining slice multiplexing and angle multiplexing in this manner, it is possible to increase the number of multiplexed holograms (data density). Although the masking plate-mounted transparent plate 83 is employed in this example, it is also possible to employ the masking plate 52 which is not provided with a transparent plate (see FIG. 1) instead of the masking plate-mounted transparent plate 83.

Second Exemplary Embodiment

For the first exemplary embodiment, an example has been described in which light transmitted through the horizontally long slit is Fourier-transformed to generate vertically long reference light. However, in a second exemplary embodiment, light which has passed through a vertical slit is focused inside a hologram recording medium using a focusing optical system, and vertically long reference light is generated to implement slice multiplexing. In addition, in the second exemplary embodiment, slice multiplexing and angle multiplexing are combined.

Figure 13:
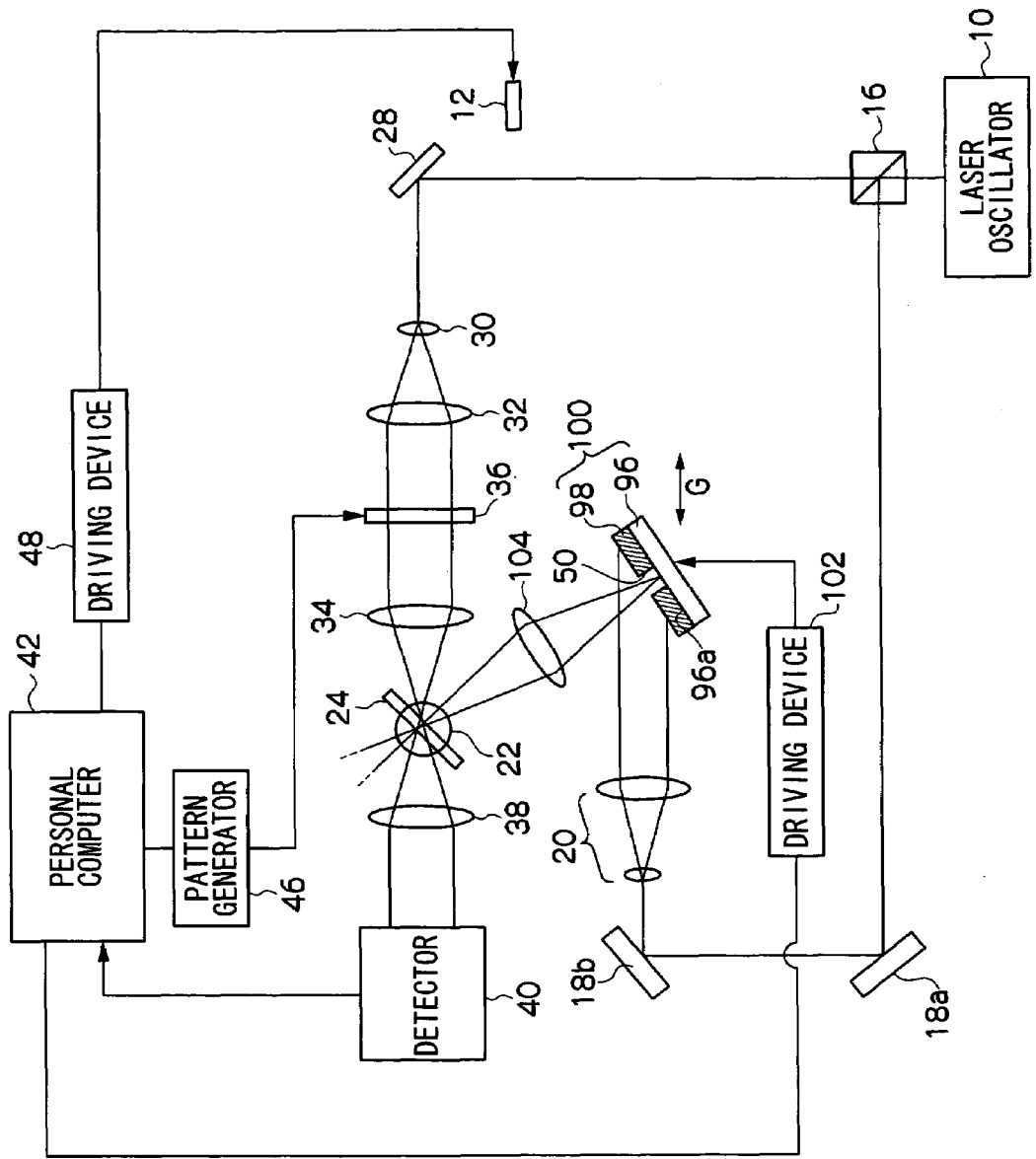
FIG. 13 is a schematic view of a hologram recording/reproduction device of a second exemplary embodiment of the present invention.

As shown in FIG. 13, the hologram recording/reproduction device of the present exemplary embodiment differs from the first exemplary embodiment in respect of a reference light generation system. A signal light generation system has the same structure as in the first exemplary embodiment. Accordingly, only points of difference will be described, while matching structural portions will be assigned the same reference numerals and descriptions thereof will not be given.

Figure 18:
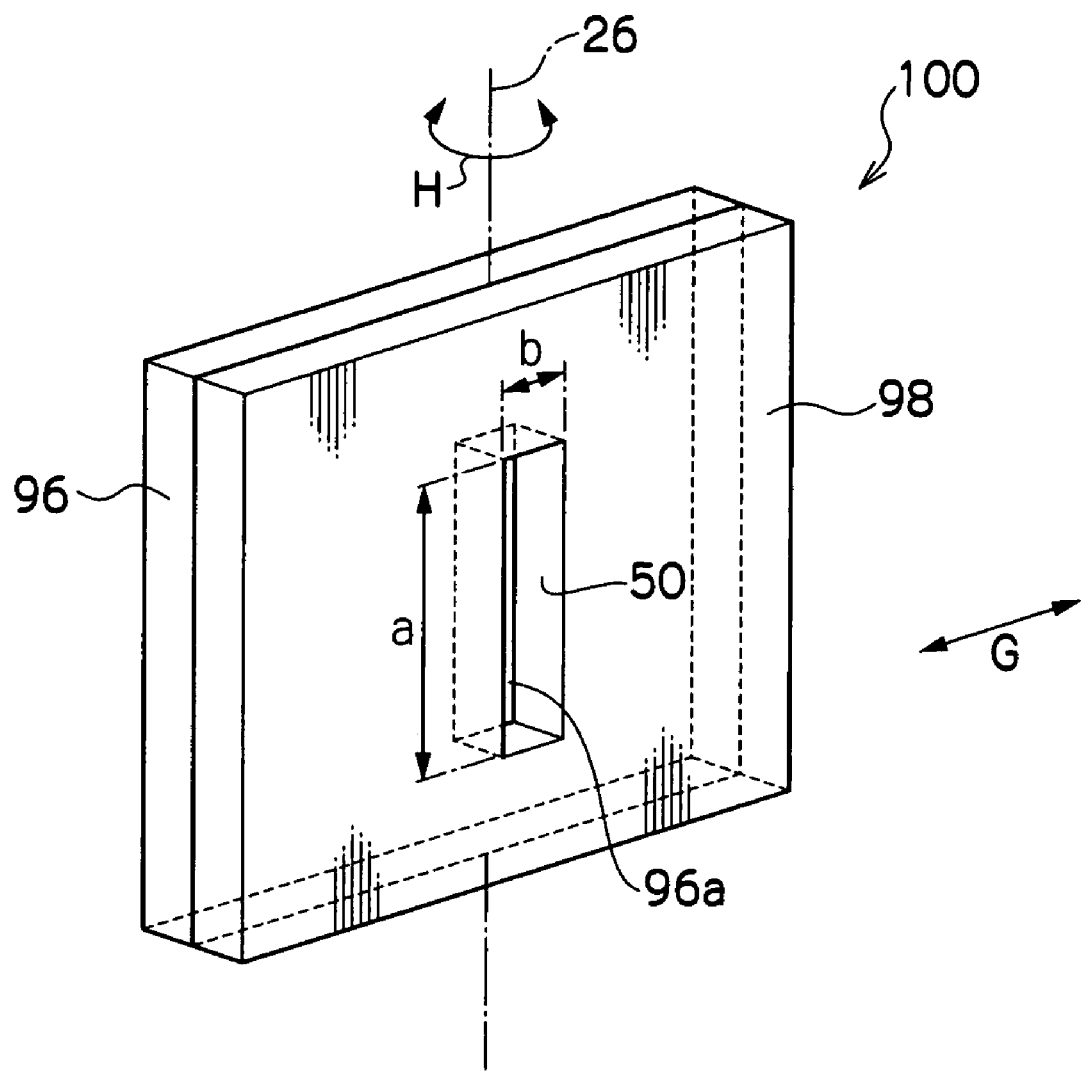
FIG. 18 is a perspective view showing structure of a reflection member at which a mask including a slit is formed.

Reflection mirrors 18a and 18b, the pair of lenses 20, which collimate the reference light laser beam, and a reflection member 100 are disposed in this order at the light reflection side of the half-mirror 16. The reflection mirrors 18a and 18b reflect the reference light laser beam and change the light path thereof to a hologram recording medium direction. As shown in FIG. 18, the reflection member 100 is provided with a reflection plate 96 and a shading mask 98, which is formed on a reflection surface 96a of the reflection plate 96. A slit 50, a short direction of which is in the direction of arrow G, is formed in the shading mask 98. Thus, the reflection surface 96a of the reflection plate 96 is exposed only at a portion at which the slit 50 is formed.

The reflection member 100 is retained to be movable in the directions of arrow G by a retention member (not shown) which serves as a guide, and is retained to be turnable so as to turn in the directions of arrow H about an axis 26. The stage 22 is provided at the laser light reflection side of the reflection member 100. The stage 22 retains a lens 104 and the hologram recording medium 24 at predetermined positions. Reference light which has been transmitted through the slit 50 of the shading mask 98 is reflected by the reflection surface 96a of the reflection plate 96, and is focused by the lens 104 to generate reference light. The generated reference light is illuminated onto the hologram recording medium 24 simultaneously with the signal light, the signal light and the reference light interfere inside the hologram recording medium 24, and an interference pattern is recorded as a hologram.

Figure 14:
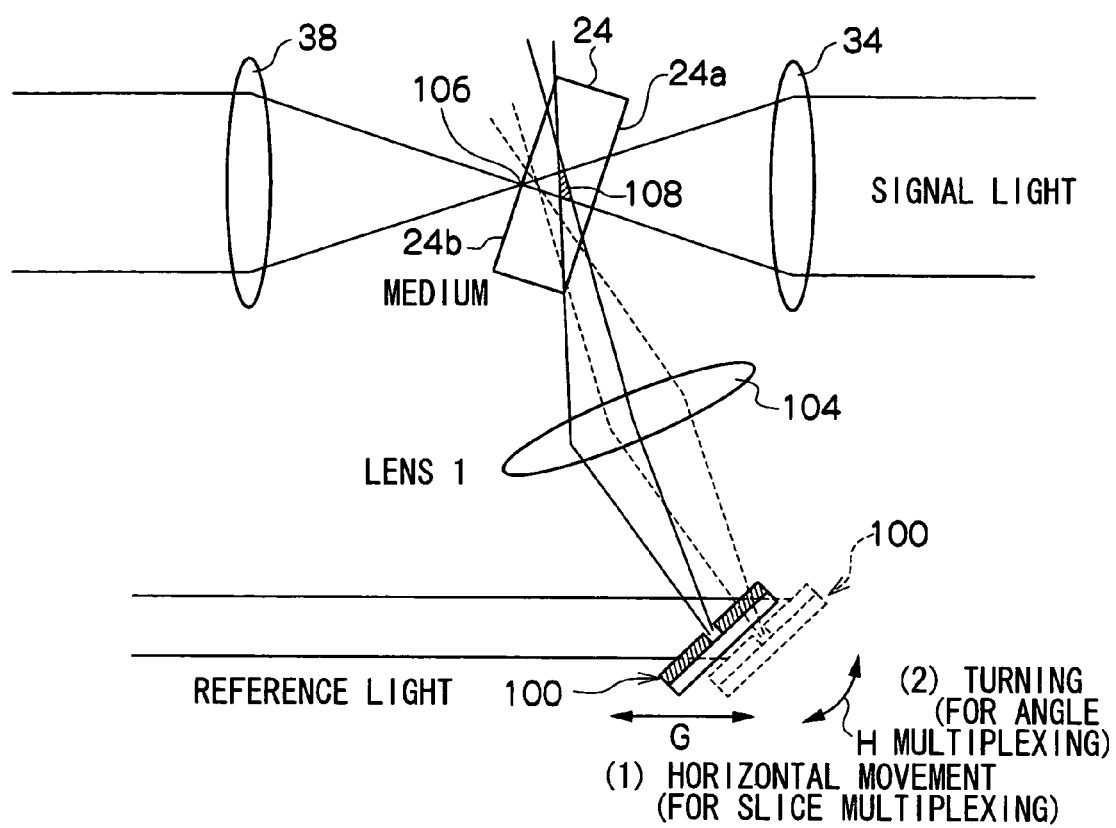
FIG. 14 is an explanatory view for describing a process of slice multiplexing recording.
Figure 15:
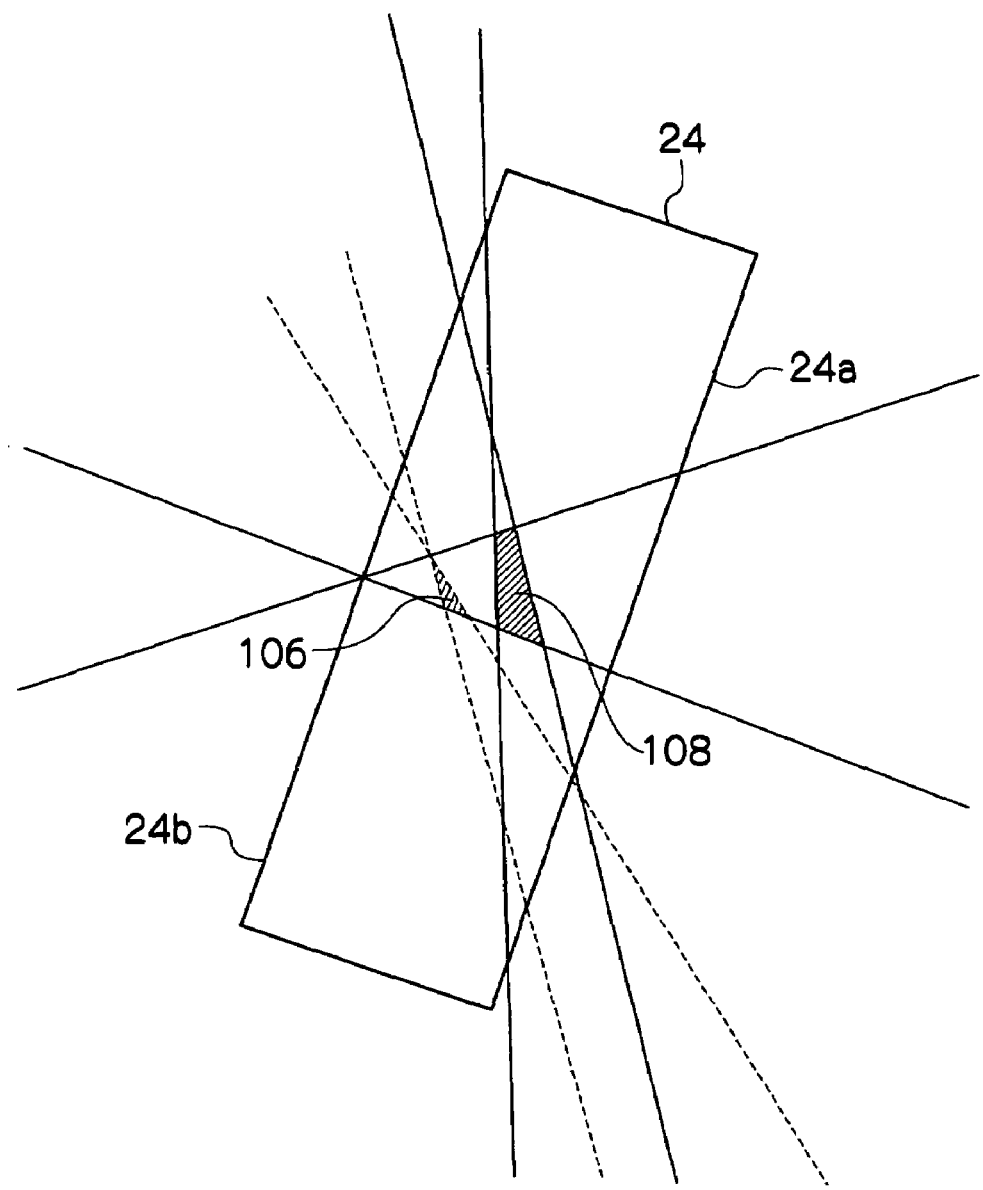
FIG. 15 is a conceptual view showing a recording region which is recorded at by slice multiplexing.

In the present exemplary embodiment, firstly, as shown in FIGS. 14 and 15, the vertically long reference light is illuminated and a first hologram is recorded at a region of intersection 106 with the signal light (shown by dotted lines). Then, the reflection member 100 is moved by a predetermined interval (for example, the focused length of the short side of the slit) in the direction of arrow G (to leftward in the drawings), the vertically long reference light is illuminated, and a second hologram is recorded at a region of intersection 108 with the signal light (shown by solid lines). In this manner, holograms are recorded in order from the emission face 24b side which is at the opposite side of the recording light incidence face 24a of the hologram recording medium 24. Thus, a plurality of holograms can be recorded in the hologram recording medium 24. For the present exemplary embodiment, an example has been described in which two holograms are recorded with a predetermined spacing, but the number of holograms to be recorded can be increased by reducing the x-direction beam width of the reference light, that is, the focused length of the short side of the slit. The length of the short side of the slit as focused inside the recording medium can be made smaller by, for example, reducing the length of the short side of the slit and/or reducing a focusing magnification rate as described below.

As can be seen from this example, for slice multiplexing, it is sufficient if the signal light and the reference light are caused to sequentially intersect such that the illumination region of the signal light is sliced up by the vertically long reference light, and it is not necessary for the vertically long reference light to be mutually parallel. An x-direction beam width $b_i$ and y-direction beam width $a_i$ of the reference light at the Fourier transform plane $P_F$ are set in accordance with a focusing length f of the lens, a distance s from the lens 104 to the slit 50, a distance s' from the lens 104 to the optical recording medium, and opening widths a and b of the slit 50. For example, if $1/f=1/s+1/s'$, a ratio m (magnification) between the size of the image and the size of the slit is $m=s'/s$. Therefore, $a_i=ma$ and $b_i=mb$. Now, in this second exemplary embodiment, the slit 50 is a rectangular opening, a is the long direction opening width and b is the short direction opening width. As described above, provided the y-direction beam width $a_i$ of the reference light intersects with diffraction components of at least the Nyquist region of the Fourier transform pattern of the signal light, required information of the signal light can be recorded as a hologram.

The y-direction beam width $a_i$ of the reference light at the Fourier transform plane $P_F$ interferes with all frequency components of the signal light (at least a Nyquist component and above). The x-direction beam width $b_i$ of the reference light at the Fourier transform plane $P_F$ is desirably as small as possible, in order to increase the number of multiplexed holograms. For example, if the x-direction beam width $b_i$ of the reference light is set to 100 μm, it is possible to record 10 holograms by slice multiplexing in a recording layer with thickness 1 mm. Herein, the spacing between holograms that neighbor one another can be set in accordance with the x-direction beam width bi of the reference light.

Moreover, with the present exemplary embodiment, a plurality of holograms can be multiplexed by angle multiplexing, by turning the reflection member 100 in the directions of arrow H about the axis 26 and altering the incidence angle of the reference light thereat. The number of multiplexed holograms is further increased by combining the slice multiplexing with the angle multiplexing. In slice multiplexing, from recording theory, the greater the thickness of the optical recording medium, the greater the number of slices into which the reference light can slice the signal light can be increased.

Further, in slice multiplexing, because the width of the reference light is small, sizes of the holograms that are recorded are small. Meanwhile, because a film thickness of the optical recording medium is large, a reduction in angle selectivity is consequently smaller. Therefore, the number of multiplexed holograms in angle multiplexing will not be reduced. Thus, it is possible to further increase the number of multiplexed holograms (data density) by combining the slice multiplexing with the angle multiplexing.

As described hereabove, with the second exemplary embodiment, similarly to the first exemplary embodiment, a plurality of holograms can be recorded in a hologram recording medium by slice multiplexing, and the number of multiplexed holograms (i.e., data density) can be increased. Furthermore, by combining slice multiplexing with another multiplexing method (angle multiplexing, shift multiplexing, wavelength multiplexing or polytopic multiplexing), a further increase in the number of multiplexed holograms is possible.

Moreover, with slice multiplexing, because the illumination region of the reference light when an individual hologram is to be recorded is small, unnecessary exposure by the reference light is reduced. Further, with slice multiplexing, an illumination position of the reference light is shifted to perform the multiplex recording, and there is no need to move the hologram recording medium, which is convenient.

Figure 16:
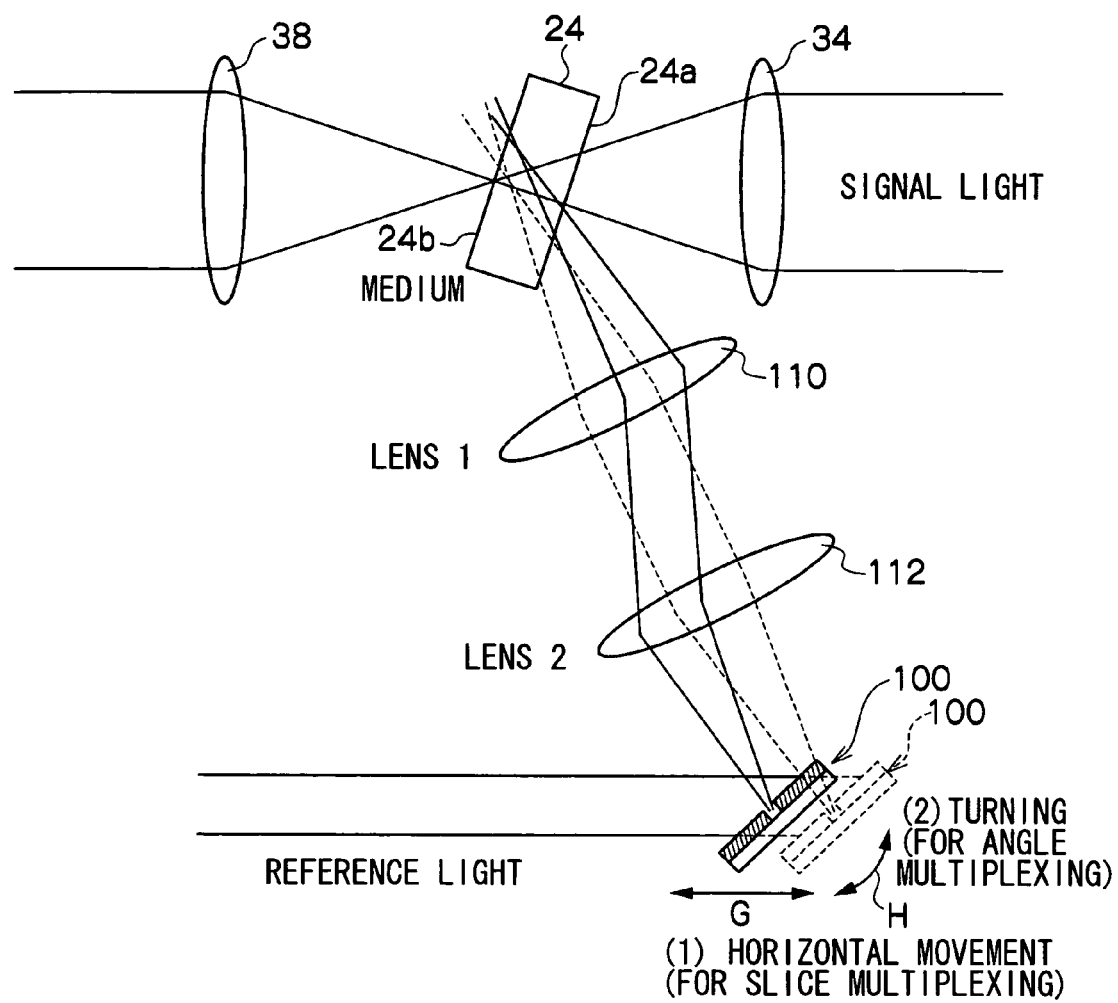
FIG. 16 is a schematic view showing further yet another example of structure with which the illumination position of the reference light is shifted.

For the second exemplary embodiment, an example has been described in which the focusing optical system is structured by a single lens. However, formation of a 4f optical system with two lenses is also possible. For example, as shown in FIG. 16, a 4f optical system can be structured, in which a lens 110 and a lens 112 are disposed between the reflection member 100 and the hologram recording medium 24 and a distance from the reflection member 100 to the hologram recording medium 24 is four times a focusing distance f of the lens 110 and lens 112. Furthermore, magnifications/reductions of image size are enabled by the focusing distances of the lens 110 and the lens 112 being made to be different.

In the first and second exemplary embodiments described above, a slit is employed in order to obtain the vertically long reference light. However, rather than a slit, it is also possible to generate reference light with a narrow width using an optical fiber, a waveguide or a surface emission semiconductor laser array (a VCSEL array). These are disposed close to the hologram recording medium to illuminate the reference light. In particular, it is desirable if spreading due to diffraction can be kept small. It is also possible to utilize a diffusion plate which diffuses in only one direction. It is further possible to utilize a spatial light modulator (SLM) instead of the slit to move the reference light. For example, it is possible to obtain effects equivalent to moving a slit by altering pixels which transmit (or reflect) light.

Further, for the above-described first and second exemplary embodiments, examples have been described of recording in an order from the emission face side of the hologram recording medium, but it is also possible to record in an order from the incidence face side. However, in a case in which a hologram recording medium that requires fixing processing is employed, holograms will be recorded in order from the emission face side of the hologram recording medium, in order to reduce effects of unwanted scattering light from already recorded holograms.

In the above descriptions, the shape of the reference light that is illuminated at the hologram recording medium has been rectangular, but is not limited thus. For example, the shape could be a square or an ellipse. Moreover, in the above descriptions, an example has been described of causing a Fraunhofer diffraction image of reference light to intersect with signal light inside a hologram recording medium to record a hologram. However, the diffraction image of the reference light is not limited thus. For example, a Fresnel diffraction image could be employed. That is, a hologram can be recorded if diffraction components of at least the Nyquist region of the signal light intersect with the reference light in the hologram recording medium.

Furthermore, in the above descriptions, shifting the light path of the reference light when the intersection region of the signal light and the reference light is to be shifted has been taken as an example, but this is in no way limiting. It is also possible to implement a slice multiplexing recording method by moving the hologram recording medium in the direction of the optical axis of the signal light.

Furthermore, holograms to be recorded by the present invention could be intensity-modulated holograms, and could be polarization-modulated holograms.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A hologram recording method for recording information of signal light as a hologram at an optical recording medium, the method comprising:
   illuminating signal light at the optical recording medium;
   illuminating reference light at the optical recording medium simultaneously with the signal light such that an interference pattern is formed by the signal light and the reference light intersecting in the optical recording medium; and
   shifting a region in the optical recording medium at which the signal light and the reference light intersect, by shifting an illumination position of the reference light along an optical axis of the signal light, thereby recording a plurality of holograms in the recording medium,
   wherein the reference light is illuminated at the optical recording medium via a transparent plate including two mutually parallel surfaces, and
   translational movement of the reference light is implemented by turning the transparent plate so that the incidence angle of the reference light onto the transparent plate is altered.

2. The hologram recording method of claim 1 wherein, at the region in the optical recording medium at which the signal light and the reference light intersect, a projection length of the reference light in a direction along the optical axis of the signal light is shorter than a projection length of the reference light in a direction crossing the direction of the optical axis.

3. The hologram recording method of claim 1, wherein the signal light and the reference light are caused to intersect at a region different from a region of recording of a previously recorded hologram for recording another hologram in the optical recording medium.

4. The hologram recording method of claim 1, wherein the region in the optical recording medium at which the signal light and the reference light intersect is shifted by translationally moving the illumination position of the reference light along the optical axis of the signal light, while keeping an angle between the signal light and the reference light constant.

5. The hologram recording method of claim 4, wherein the illumination position of the reference light is translationally moved along the optical axis of the signal light by a predetermined interval.

6. The hologram recording method of claim 1, wherein a masking plate in which a slit is formed is mounted at the transparent plate, at a side thereof at which the reference light is incident.

7. A hologram recording device comprising:
   a signal light illumination unit that illuminates signal light at an optical recording medium;
   a reference light illumination unit that illuminates reference light at the optical recording medium simultaneously with the signal light; and
   a movement mechanism that moves an illumination position of the reference light such that the illumination position of the reference light shifts along an optical axis of the signal light,
   wherein the reference light is illuminated at the optical recording medium via a transparent plate including two mutually parallel surfaces, and
   translational movement of the reference light is implemented by turning the transparent plate so that the incidence angle of the reference light onto the transparent plate is altered.

8. The hologram recording device of claim 7 wherein, at a region in the optical recording medium at which the signal light and the reference light intersect, a projection length of the reference light in a direction along the optical axis of the signal light is shorter than a projection length of the reference light in a direction crossing the direction of the optical axis.

9. The hologram recording device of claim 7, wherein the signal light and the reference light are caused to intersect at a region different from a region of recording of a previously recorded hologram for recording another hologram in the optical recording medium.

10. The hologram recording device of claim 7, wherein a region in the optical recording medium at which the signal light and the reference light intersect is shifted by translationally moving the illumination position of the reference light along the optical axis of the signal light, while keeping an angle between the signal light and the reference light constant.

11. The hologram recording device of claim 7, wherein the illumination position of the reference light is translationally moved along the optical axis of the signal light by a predetermined interval.

12. The hologram recording device of claim 7, wherein the movement mechanism further comprises a masking plate in which a slit is formed, which is mounted at the transparent plate at a side thereof at which the reference light is incident.

* * * * *